United States Patent [19]
McCall

[11] Patent Number: 6,112,981
[45] Date of Patent: *Sep. 5, 2000

[54] BAR CODE READER FOR A FUEL DISPENSER

[75] Inventor: Don Charles McCall, Round Rock, Tex.

[73] Assignee: Dresser Industries, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/026,634

[22] Filed: Feb. 20, 1998

Related U.S. Application Data

[60] Provisional application No. 60/039,007, Feb. 25, 1997.

[51] Int. Cl.[7] .............................. G06F 17/00; G07B 15/02
[52] U.S. Cl. .............................................. 235/375; 235/384
[58] Field of Search .................................. 235/380, 381, 235/378, 385, 451, 472.01, 472.03, 384, 375; 902/27; 705/413; 702/45

[56] References Cited

U.S. PATENT DOCUMENTS

| | | | |
|---|---|---|---|
| 3,660,858 | 5/1972 | Smith, Jr. . | |
| 3,786,421 | 1/1974 | Wostl et al. . | |
| 4,199,100 | 4/1980 | Wostle et al. | 235/381 |
| 4,396,902 | 8/1983 | Warthan et al. | 382/320 |
| 4,723,212 | 2/1988 | Mindrum et al. | 705/14 |
| 4,881,581 | 11/1989 | Hollerback . | |
| 4,910,672 | 3/1990 | Off et al. | 705/14 |
| 5,056,019 | 10/1991 | Schultz et al. | 705/14 |
| 5,173,851 | 12/1992 | Off et al. | 705/14 |
| 5,260,552 | 11/1993 | Colbert et al. | 235/482 |
| 5,340,969 | 8/1994 | Cox | 235/381 |
| 5,393,966 | 2/1995 | Gatto et al. | 235/440 |
| 5,506,395 | 4/1996 | Eppley . | |
| 5,531,482 | 7/1996 | Blank | 283/67 |
| 5,602,745 | 2/1997 | Atchley et al. . | |
| 5,612,868 | 3/1997 | Off et al. | 705/14 |
| 5,822,735 | 10/1998 | De Lapa et al. | 705/14 |
| 5,832,457 | 11/1998 | O'Brien et al. | 705/14 |
| 5,895,457 | 4/1999 | Kurowski et al. | 235/381 X |
| 5,901,303 | 5/1999 | Chew | 711/115 |
| 5,913,180 | 6/1999 | Ryan | 702/45 |

FOREIGN PATENT DOCUMENTS

| | | |
|---|---|---|
| 0114447 | 8/1984 | European Pat. Off. . |
| 4013147 | 10/1991 | Germany . |
| 9409457 | 4/1994 | WIPO . |
| 9642061 | 12/1996 | WIPO . |

*Primary Examiner*—Donald Hajec
*Assistant Examiner*—Jared J. Fureman
*Attorney, Agent, or Firm*—Haynes and Boone, LLP

[57] ABSTRACT

A system and method to adapt a fuel dispenser and related facilities to accept bar coded cards in addition to or instead of magnetic strip cards. A standard bar code reader is used in conjunction with a magnetic strip card reader. The bar code reader includes a light detector and a light source. The light detector and light source are secured so that they may visually access a card in the magnetic strip card reader. This allows the light detector to access bar coded data that is printed on a bar coded card. Furthermore, the addition of the bar code reader does not prevent the magnetic strip card reader from also reading a magnetic strip if it is present on the card. When a bar coded card is slid into the magnetic strip card reader, the bar code reader interprets the signals generated thereby and "decodes" the signals into corresponding numbers. These numbers are then sent over a data bus to a controller, where they are interpreted. Once interpreted, the numbers can be used similarly to numbers conventionally produced by a magnetic strip card, or can be used separately to provide additional services and/or advantages, such as updating a frequent purchase account.

29 Claims, 4 Drawing Sheets

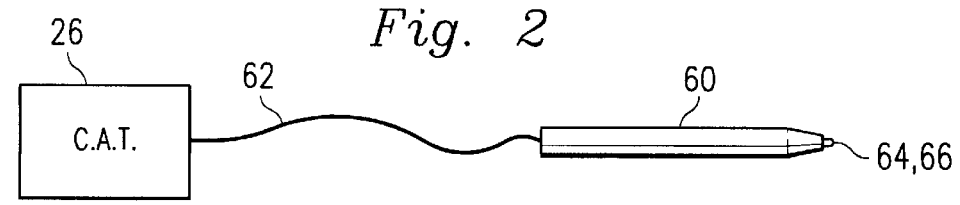
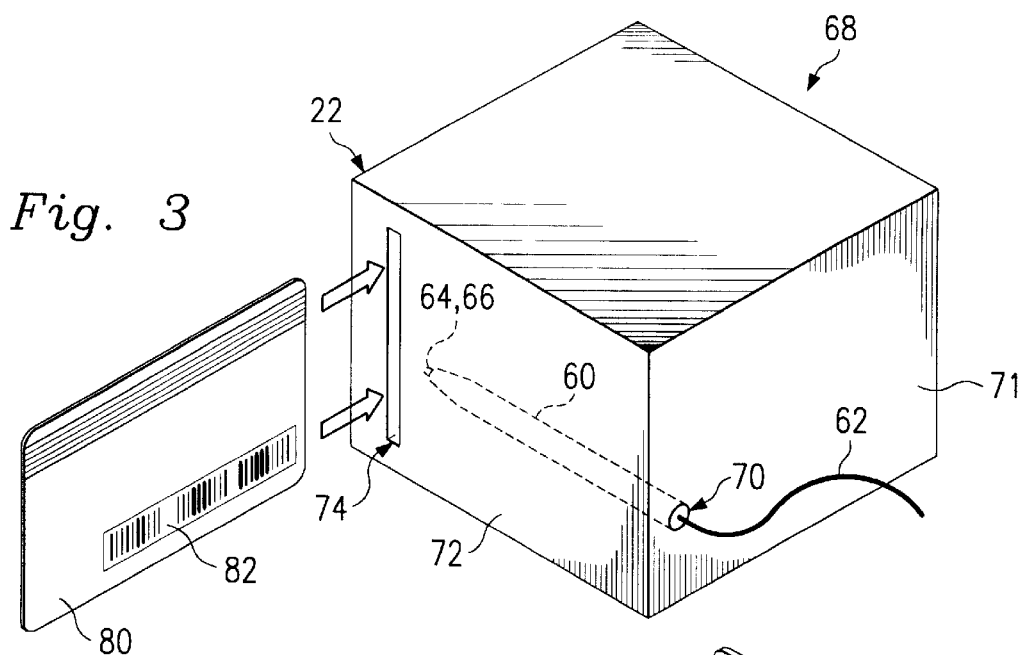
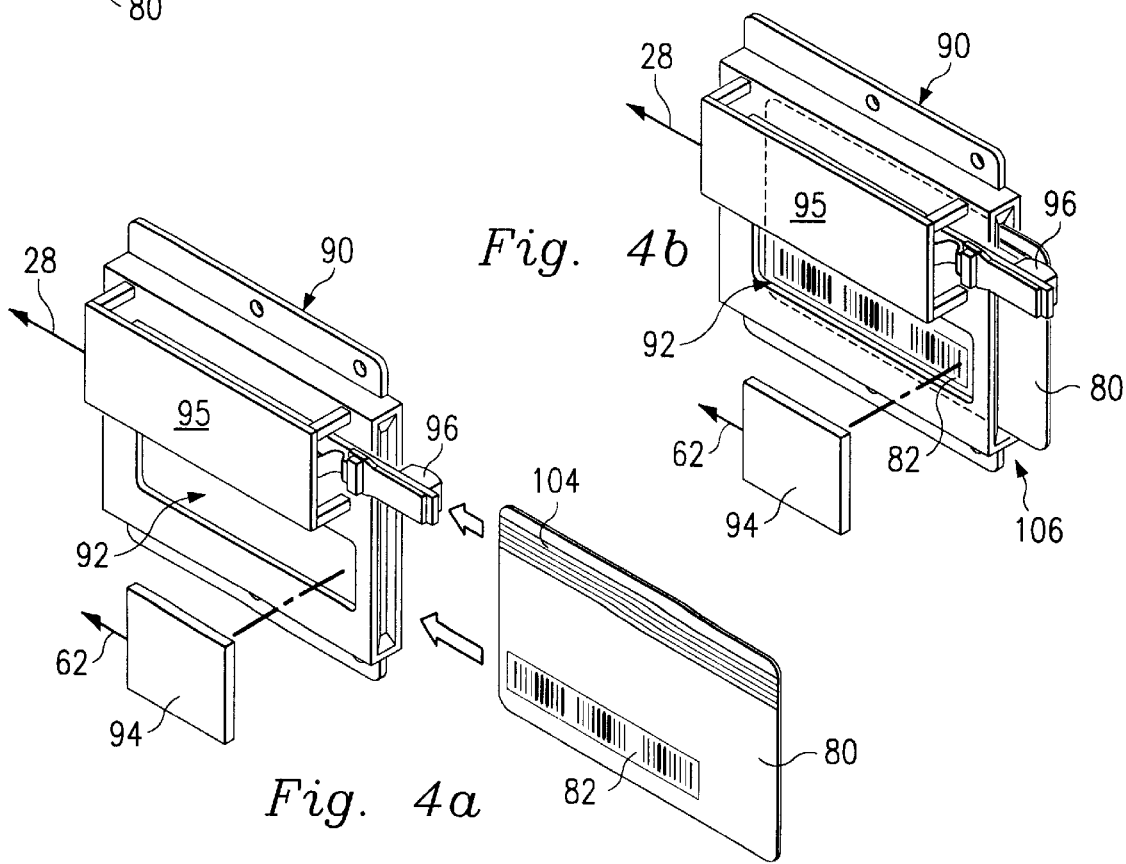

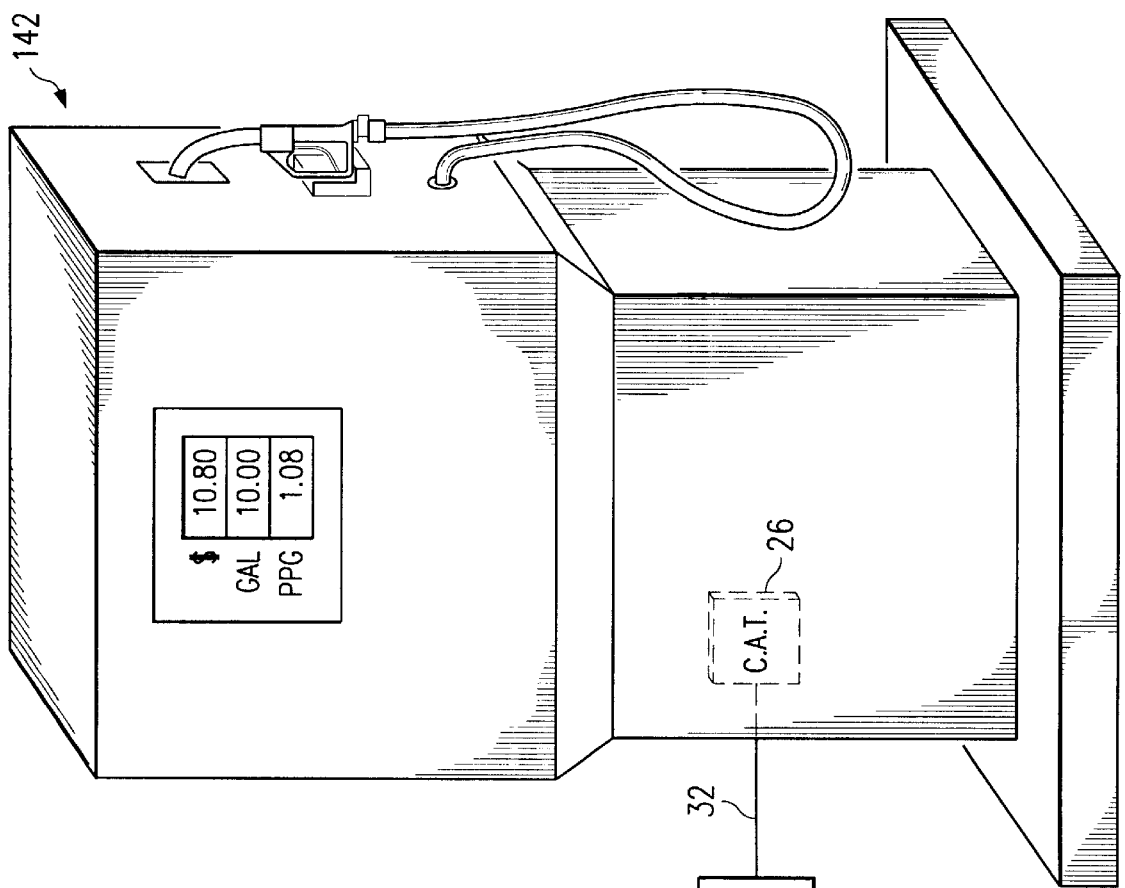
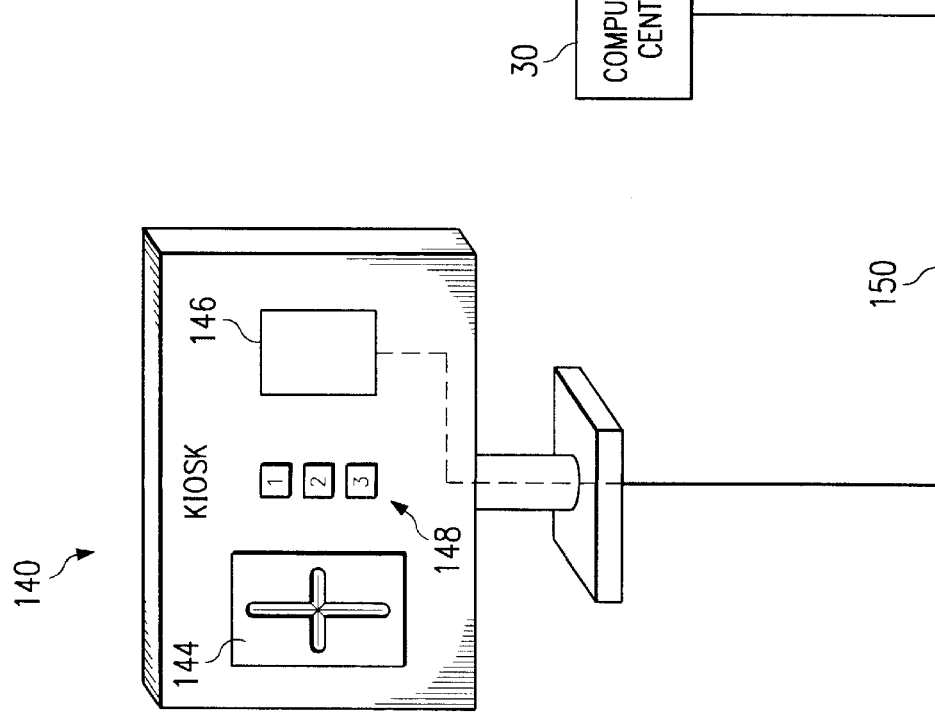

BAR CODE READER FOR A FUEL DISPENSER

This invention claims the benefit of U.S. Provisional Application Ser. No. 60/039,007, which was filed Feb. 25, 1997.

BACKGROUND OF INVENTION

This invention relates to retail fuel dispensers and more particularly, to a device that will allow a fuel dispenser to read standard bar coded data.

For more than a decade, retail fuel dispensers have included magnetic strip card readers for reading magnetic strip debit/credit cards. The magnetic strip cards are typically small plastic cards that contain a strip of magnetic material (i.e., magnetic data) that includes information such as an account number and a credit or debit facility (e.g., a bank).

However, many retailers, such as those used by various wholesale food clubs or video stores, have an established customer base that uses bar coded cards. Bar coded cards are also typically small plastic cards, but instead of having a magnetic strip, they contain bar codes (i.e. optical data) that identify a certain account with the retailer. These bar coded cards allow the retailers to provide many benefits, such as providing customers with frequent shopper awards, preventing unauthorized use, providing certain purchase discounts, and identifying an internal payment account.

A problem arises when these retailers, with an established customer base with bar coded cards, wish to sell fuel using conventional fuel dispensers. Since conventional fuel dispensers cannot read bar coded cards, one solution is for the retailers to provide their customers with magnetic strip cards for purchasing fuel in addition to the bar coded card already in use. However, such a solutions is not only expensive, it is undesirable for many customers to keep two cards for a single retailer.

Another solution is to require the customers to switch from the bar coded card to the magnetic strip card. This solution is impractical because so many bar coded cards are already in use and it would be very expensive to convert them. Also, many facilities of the retailers already include bar code readers that would require replacement.

Therefore, what is needed is a system and method to easily adapt a conventional fuel dispenser and related facilities to accept bar coded cards in addition to or instead of magnetic strip cards.

SUMMARY OF THE INVENTION

It is therefore an object of the present invention to provide a system and method to adapt a fuel dispenser and related facilities to accept bar coded cards in addition to or instead of magnetic strip cards. To this end, one embodiment of the invention uses the basic circuitry of a standard bar code reader in conjunction with a magnetic strip card reader. The bar code reader includes a light detector and a light source. The light detector and light source are secured so that they may visually access a card in the magnetic strip card reader. This allows the light detector to access bar coded data that is printed on a bar coded card. Furthermore, the addition of the bar code reader does not prevent the magnetic strip card reader from also reading a magnetic strip if it is present on the card.

When a bar coded card is slid into the magnetic strip card reader, the bar code reader interprets the signals generated thereby and "decodes" the signals into corresponding numbers. These numbers are then sent over a data bus to a controller, where they are interpreted. Once interpreted, the numbers can be used similarly to numbers conventionally produced by a magnetic strip card, or can be used separately to provide additional services and/or advantages, such as updating a frequent purchase account.

In another embodiment, a system for dispensing fuel includes a reader, a controller, and a database. The reader reads bar coded data, such as from a bar coded card, and provides it to the controller. The controller then provides the bar coded data to be used by the database for returning a control signal. The control signal may indicate to the dispenser to dispense fuel, or may indicate a benefit or discount to be provided.

The bar code reader may be a scanning bar code reader capable of reading various items, such as bar coded receipts. The scanning bar code reader may be placed on the front face of the dispenser, or on a kiosk connected to the dispenser.

BRIEF DESCRIPTION OF THE DRAWING

FIG. 2 is a diagram of a bar code wand used in the fuel dispenser system of FIG. 1.

FIG. 3 is a diagram of a card reader device used in the fuel dispenser system of FIG. 1.

FIGS. 4a and 4b are diagrams of another card reader device used in the fuel dispenser system of FIG. 1.

FIG. 7 is an diagram of a kiosk used with a conventional fuel dispenser system for implementing features of the present invention.

DETAILED DESCRIPTION

Figure 1:
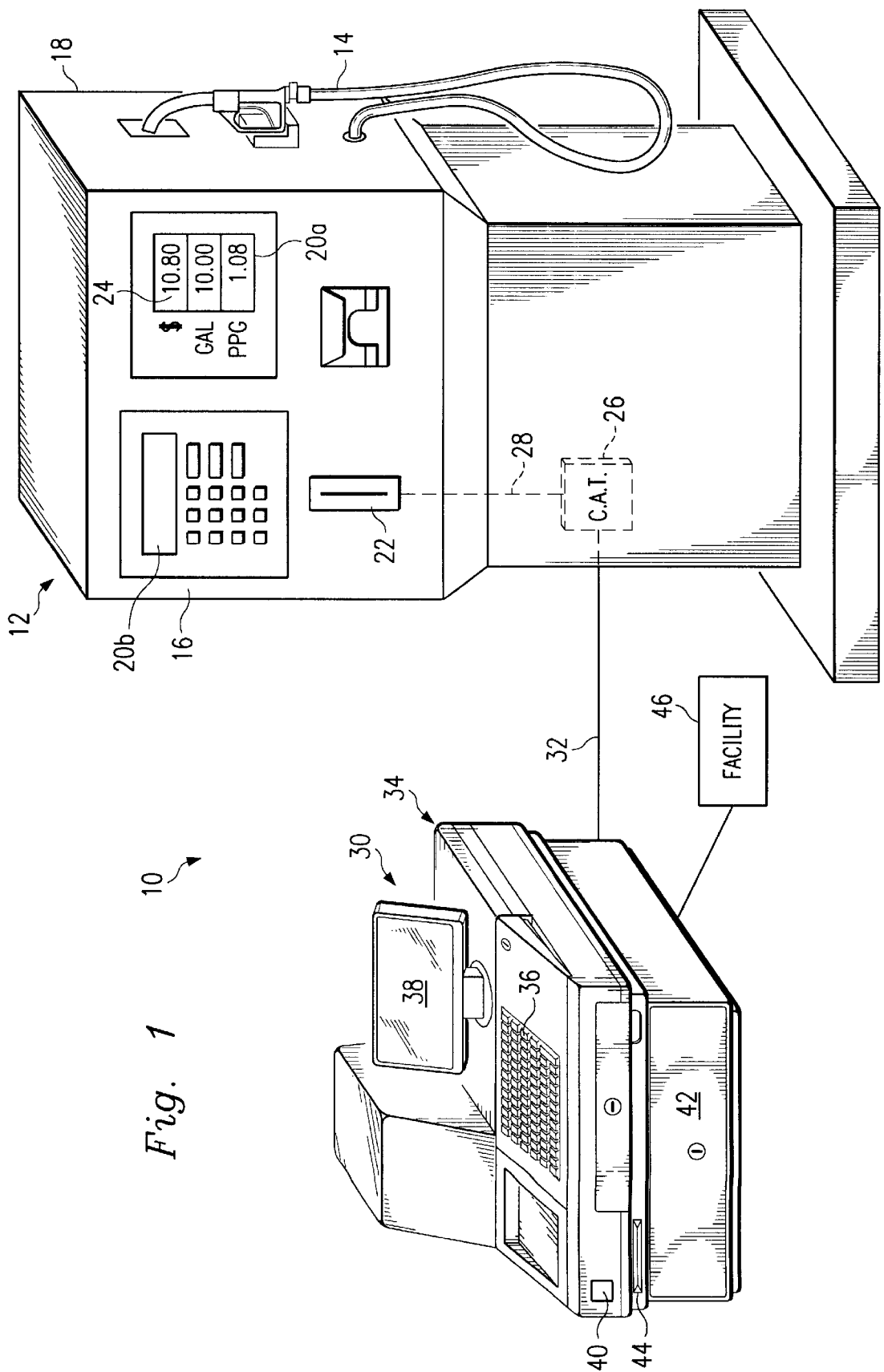
FIG. 1 is a diagram of a fuel dispenser system embodying features of the present invention.

In FIG. 1, the reference numeral 10 designates a fuel dispenser system embodying features of one embodiment of the present invention. The fuel dispenser system 10 includes a fuel dispenser 12, which contains many elements of a conventional fuel dispenser such as a fuel nozzle 14 connected to a fuel supply (not shown). The dispenser 12 has a front side 16 and a back side 18. In the following description, only the front side 16 will be discussed for ease of description. However, the features described herein may also be applied on the back side 18, thereby allowing the dispenser to be operated by two customers at the same time.

The front side 16 houses a conventional graphics displays 20a, 20b and a reader device 22 embodying features of the present invention. The graphics displays 20a, 20b each include a large, conventional, LCD panel for showing text and numerals, such as a price 24 that corresponds to an amount of fuel dispensed, or other customer-related messages. The reader device 22 includes magnetic strip reading circuitry connected to a controller 26 through a ribbon cable 28 such as an RS232 serial data bus. For the sake of example, the controller 28 controls the reader device 22 as well as other functions of the dispenser 12, such as a controller that includes a Customer Activated Terminal ("CAT") computer produced by the Wayne Division of Dresser Industries. Both the controller 26 and the ribbon cable 28 are conventional devices housed inside the dispenser 12. It is understood that the reader device 22 and controller 26 continue to provide conventional magnetic strip reading functions in addition to the functions and features herein described.

The controller 26 is also connected to a computing center 30 through a bus 32. In one embodiment, the computing center 30 is remotely located inside a store (not shown) where it may be readily accessed. The computing center 30 includes a point-of-sale ("POS") controller 34. The POS controller 34 includes many features of a conventional electronic cash register, such as a keyboard 36, a display 38, a database 40, a cash drawer 42, and an internal card reader device 44, for use by an operator in charge of overseeing and maintaining the dispenser system 10. It is understood that the database 40 may be remote, and is shown with the POS 34 for ease of description. Also, the POS controller 34 may be in communication with other systems or devices, such as a carwash facility 46.

The database 40 contains a collection of records pertaining to its customers. For example, the store may be a member-oriented retail outlet, and a record for each customer indicates that the customer is a member and a "level" of benefits or privileges that the customer may receive. One level may indicate a first discount to the customer of the goods he purchases while another level may indicate a second discount. The POS controller 34 can thereby receive information from the controller 26, access the database 40, and return control codes which indicate, for example, membership status, level of benefits, or an "OK" signal to allow fuel dispensing.

Referring to FIG. 2, the controller 26 is also connected to one end of a bar code detector wand 60 with a second ribbon cable 62. The bar code detector wand 60 is a standard, decoded-type hand-held stationary beam bar code reader such as the Welsh Allyn model Scanteam ST6180 reader. The bar code detector wand 60 also includes, at the end opposite the second ribbon cable 62, a photo detector 64 and a light source 66. The photo detector 64 may be a photo cell, photo diode or photo transistor, while the light source 66 may be a light emitting diode.

Referring to FIG. 3, the reader device 22 is surrounded by a housing 68 and a hole 70 is established on a side face 71 of the housing near a front face 72. The hole 70 extends to a slot 74 used for receiving cards such as debit/credit cards, but is separated from the slot by a small plastic or glass window (not shown). As a result, the hole 70 does not interfere with any pre-existing circuitry of the reader device 22. The hole 70 is also of sufficient size for viewing one bit of bar coded data at a time. The bar code detector wand 60 is inserted into the reader device 22 through the hole 70 so that the end with the ribbon cable 62 hangs out of the hole. In this way, the photo detector 64 is installed behind the small window and may access cards slid into and out-of the slot 74.

In operation, the reader device 22 receives a bar coded card 80. As the bar coded card 80 is slid into the slot 74, light from the light source 66 reflects off the bar coded card 80 so that the photo detector 64 can sequentially read bits of optical (bar coded) data 82 stored on the card. The bar code detector wand 60 interprets the bar coded data 82 and coverts it into ASCII data, which it transmits to the controller 26 through the ribbon cable 62. Firmware in the controller 26 detects the presence of the ASCII data and processes it into electronic data, a method similar to that used to process magnetic strip cards. The controller 26 then transmits the electronic data to the POS controller 34 through the bus 32. The POS controller 34 uses the electronic data in order to secure payment in accordance with the data, such as by forwarding the electronic data to a credit card processing network (not shown) for authorization and/or charging the sale to an account associated with the electronic data. The POS controller 34 then returns one or more control codes that direct the controller 26 to allow fuel to dispense and potentially, to indicate any discounts to be provided.

In another embodiment, the bar coded data 82 is processed by the POS controller 34 and a local billing file is established for billing the customer later. It is also possible for the POS controller 34 to have a local negative file of all invalid account numbers or a local positive file of all valid card numbers. In such cases the electronic data could be kept and billed locally, or forwarded in "batches" to another computer on-site or off-site for billing. The electronic data provided by the bar code detector wand 60 can also be differentiated from electronic data conventionally read from a magnetic strip card by the reader 22. This differentiation may, for example, be used for frequent shopper tracking and awards, or for providing a price discount, described in greater detail below.

Referring to FIGS. 4a and 4b, in another embodiment, a reader device 90 is used in place of the reader device 22 (FIG. 3). Instead of having the roundish hole 70 for the bar code detector wand 60, the reader device 90 includes a rectangular-shaped window 92 for simultaneously viewing all of the bar coded data. The window 92 allows a scanning bar code reader 94, such as Symbol model LS1220-1300A produced by Symbol Technologies, Inc., to read the bar coded data 82 on the card 80. The scanning bar code reader 94 has many of the same components as the bar code detector wand 60, but is advantageous because it moves its light source (not shown) in multiple directions, thereby increasing its ability to read bar coded data. Also, as is the case for the reader device 22 of FIG. 3, the reader device 90 includes conventional magnetic strip circuitry 95 and a magnetic strip reader 96 to read conventional magnetic strip data.

In operation, the reader device 90 receives the card 80. The card 80 has the bar coded data 82 and may also include magnetic strip data 104 stored thereon. The reader device 90 reads the magnetic strip data 104 in a conventional manner with the magnetic strip reader 96 and reports it to the controller 26 through the ribbon cable 28, as is done in the device 22 (FIG. 3). To read the bar coded data 82, the card 80 is slid into a slot 106 of the device 90 until the bar coded data 82 is fully exposed in the window 92. Light from the light source of the scanning bar code reader 94 reflects off the bar coded data 82, thereby allowing the reader to read the data. The scanning bar code reader 94 interprets the bar coded data 82 and converts it into ASCII data, which it then transmits to the controller 26 through the ribbon cable 62. Firmware in the controller 26 detects the presence of the ASCII data and processes it into electronic data, a method similar to that used to process magnetic strip cards and described with reference to FIG. 3, above. It is understood that different combinations of bar coded and magnetic strip data are expected, and the card 80 is meant to illustrate only some of the combinations.

A benefit of the modified reader devices 22, 90 is that their modification can be done very easily, while maintaining full functionality of the remaining components. Also, the modification can be sold as a kit to simply replace the previous, conventional magnetic-strip-only reader devices with the improved devices 22, 90. Other modifications can easily be supported, such as using a single cable instead of two cables 28, 62, or sharing some or all of the circuitry 95 for use in bar coded and magnetic data interpretation.

Figure 5:
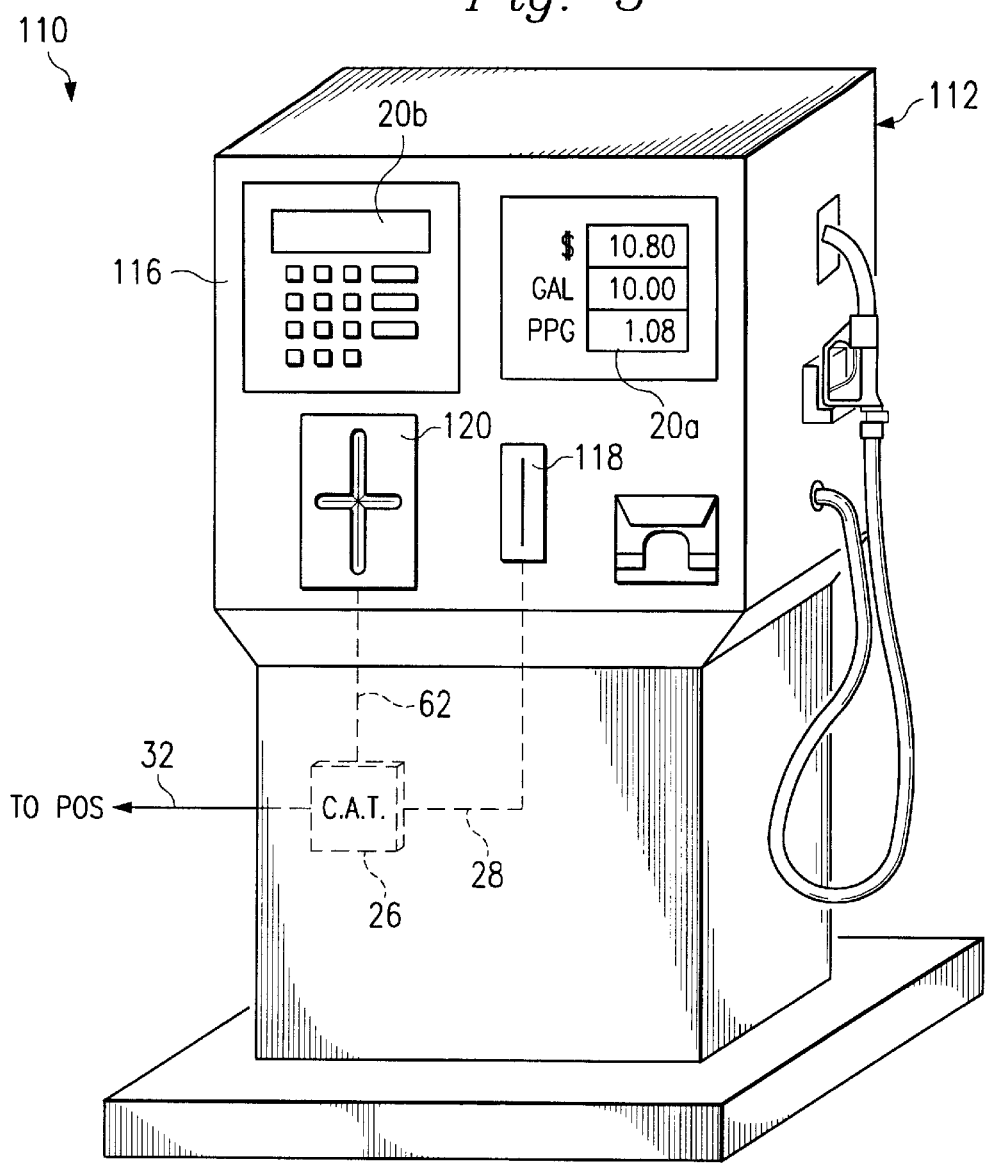
FIG. 5 is a diagram of another fuel dispenser system embodying features of the present invention.

Referring to FIG. 5, the reference numeral 110 refers to a fuel dispenser system embodying features of another embodiment of the present invention. The fuel dispenser system 110 contains a fuel dispenser 112 connected to the computing center 30 and many components similar to those in the fuel dispenser system 10 (FIG. 1), such components being similarly numbered.

A front side 116 houses the conventional graphics displays 20a, 20b and (optionally) a conventional magnetic-strip-only reader device 118. The front side 116 also houses a scanning bar code reader 120. The magnetic strip reader device 118 and scanning bar code reader 120 are connected to the controller 26 through ribbon cables 28, 62 respectively. The scanning bar code reader 120 is similar to the reader 94 (FIGS. 4a, 4b) in that it moves its light source (not shown) in multiple directions, thereby increasing its ability to read bar coded data. By being placed directly on the front side 116, the scanning bar code reader 120 realizes several additional benefits discussed in greater detail, below.

In operation, the bar coded card 80 may simply be placed or waved in front of the scanning bar code reader 120. At this time, light from the light source projected from the scanning bar code reader 120 reflects off the bar coded card 80 so that a photo detector (also not shown) can read the bar coded data 82. The scanning bar code reader 120 interprets the bar coded data 82 and converts it into ASCII data, which it transmits to the controller 26 through the ribbon cable 62. Firmware in the controller 26 detects the presence of the ASCII data and processes it into electronic data, a method similar to that used with the bar code reader 60 and described with reference to FIG. 3, above.

Figure 6:
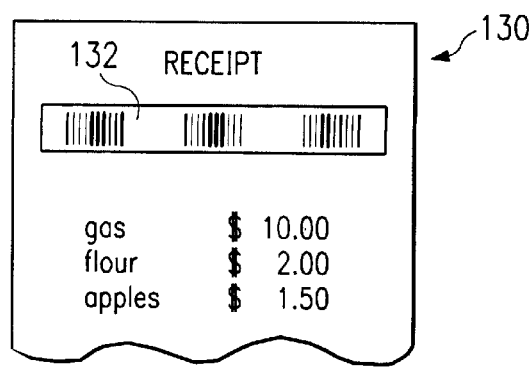
FIG. 6 is an illustration of a receipt used in the fuel dispenser system of FIG. 5.

Referring to FIG. 6, another benefit provided by the scanning bar code reader 120 is that it can read bar coded data from items other than bar coded cards. The reference numeral 130 designates a paper receipt with bar coded data 132 printed thereon. The receipt 130 may also be placed or waved in front of the scanning bar code reader 120, as described above with reference to FIG. 5.

Referring to FIG. 7, in another embodiment, a separate system, such as a kiosk 140, may be provided to interface with one or more conventional fuel dispensers 142. The kiosk 140 includes a scanning bar code reader 144, a display screen 146, and a keypad 148. The kiosk 140 is in communication with the computing center 30, which in turn is in communication with the controller 26 of the conventional dispenser 142. By using the kiosk 140, the features of the present invention may be achieved without physically modifying the fuel dispenser system 142.

Listed below are several examples of how the fuel dispenser systems described above may be used. It is understood that the functionality described below is interchangeable with the different systems, and is not meant to be an exhaustive list.

EXAMPLE A (FIGS. 5–6)

1. A customer enters a store and purchases, among other things, $10 worth of gasoline.
2. The store gives the customer a receipt (similar to the receipt 130) which includes a description of the purchases and bar coded data (similar to bar coded data 132) indicating the prepaid $10 amount.
3. The customer places the receipt in front of the scanning bar code reader 120 and then operates the fuel dispenser 110 to dispense $10 worth of gas.

EXAMPLE B (FIGS. 5–6)

1. A customer enters a store and purchases several items.
2. The store, which has a reward program that gives free gasoline, gives the customer a receipt (similar to the receipt 130) having bar coded data (similar to bar coded data 132) indicating a free $1 worth of gasoline.
3. The customer collects four more receipts over several visits to the store, each indicating a free $1 worth of gasoline.
4. The customer sequentially places the five receipts in front of the scanning bar code reader 120, and then operates the fuel dispenser 110 to dispense $5 worth of gas.
5. The customer also inserts a magnetic strip credit card into the magnetic strip reader device 118 to allow an additional amount of gasoline to be dispensed. A charge for the additional amount is reported to a credit agency identified by the magnetic strip credit card.

EXAMPLE C (FIG. 7)

1. A customer obtains a bar coded card (similar to the card 80) indicating a "member" status (e.g., the customer is eligible for certain benefits).
2. The customer places the card near the scanning bar code reader 144 of the kiosk 140. The card identifies an account and an appropriate benefit (e.g., a 10¢ per gallon discount).
3. The customer enters on the keypad 148 a number identifying the fuel dispenser 142.
4. The customer operates the fuel dispenser 142 to dispense gasoline and the account is credited for the purchase (adjusted by the 10¢ per gallon discount).

EXAMPLE D (FIGS. 1–3)

1. A customer obtains a bar coded card (similar to the card 80) which identifies a first account for a store and a conventional magnetic strip credit card which identifies a second account with a bank.
2. The customer approaches the fuel dispenser 12 associated with the store and places the bar coded card into the reader 22.
3. The customer then places the magnetic strip credit card into the reader 22.
4. The customer operates the fuel dispenser 12 to dispense gasoline and the second account is credited for the purchase.
5. The store records a data record in the first account of the customer's fuel purchase.
6. Steps 2–5, above, are repeated four more times.
7. The fuel dispenser 12 displays on the screen 20b a message:

BECAUSE YOU HAVE PURCHASED FUEL HERE
FIVE TIMES IN THE LAST THIRTY DAYS, YOU
MAY HAVE A COMPLIMENTARY CAR WASH and provides the customer with a predetermined number.
8. The customer drives to the nearby carwash facility 46 and enters the predetermined number on an attached keypad (not shown).
9. The carwash facility 46 interprets the predetermined number to identify that the customer has a complimentary carwash and performs the carwash service.

Although illustrative embodiments of the invention have been shown and described, other modifications, changes, and substitutions are intended in the foregoing disclosure. For example, the carwash facility 46 described in Example D above may also have a bar code reader connected to the computing center 30. In this way, the carwash facility 46 may provide similar functions as those described above with the reader 22. Also, the carwash facility 46 and fuel dispenser 12 may be in communication so that instead of providing a predetermined number, a record associated with the bar coded card is stored indicating the complimentary carwash. Accordingly, it is appropriate that the appended claims be construed broadly and in a manner consistent with the scope of the invention.

What is claimed is:

1. A fuel dispenser comprising:
   a nozzle for dispensing fuel;
   a controller for selectively allowing the nozzle to dispense the fuel;
   an optical reader connected to the controller for reading optical data provided by a user and transferring the optical data to the controller; and
   a magnetic strip card reader connected to the controller for reading magnetic strip data provided by the user and transferring the magnetic strip data to the controller;
   wherein, upon receipt of the optical data, the controller accesses a record associated with the optical data and allows the nozzle to dispense the fuel as part of a transaction, the terms of which are determined based upon the optical data received from the optical reader;
   and wherein the optical data received from the optical reader identifies a purchase credit to be applied to the transaction.

2. A dispenser according to claim 1 wherein the record is a billing account to which an amount associated with the dispensed fuel is provided.

3. A dispenser according to claim 2 wherein the account is either a credit account or a debit account.

4. A dispenser according to claim 1 wherein the record designates a discount for adjusting a price associated with the dispensed fuel.

5. A dispenser according to claim 1 wherein the record stores information from the dispensing for later retrieval.

6. A dispenser according to claim 1 wherein the optical reader is a bar code wand.

7. A dispenser according to claim 1 wherein the optical reader is an optical scanning device.

8. A dispenser according to claim 1 wherein the optical reader and the magnetic strip reader are connected to the controller through individual buses.

9. A dispenser according to claim 1 wherein the record designates a discount for adjusting a price associated with the dispensed fuel and the magnetic strip reader is used to update a billing account to which an amount associated with the dispensed fuel is provided.

10. A dispenser according to claim 1 wherein the optical reader is an optical scanning device located on a front face of the dispenser.

11. A dispenser according to claim 10 wherein the optical reader is also capable of reading optical data from items other than bar coded cards.

12. A dispenser according to claims 1 wherein the magnetic strip data received from the magnetic strip card reader identifies payment arrangements for the transaction after application of the purchase credit.

13. A fuel dispenser comprising:
    a nozzle for dispensing fuel;
    a controller for selectively allowing the nozzle to dispense the fuel;
    an optical reader connected to the controller for reading optical data provided by a user and transferring the optical data to the controller; and
    a magnetic strip card reader connected to the controller for reading magnetic strip data provided by the user and transferring the magnetic strip data to the controller;
    wherein, upon receipt of the optical data, the controller accesses a record associated with the optical data and allows the nozzle to dispense the fuel as part of a transaction, the terms of which are determined based upon the optical data received from the optical reader;
    and wherein the optical data received from the optical reader identifies a discount to be applied to the transaction.

14. A dispenser according to claim 13 wherein the magnetic strip data received from the magnetic strip card reader identifies payment arrangement for the transaction after application of the discount.

15. A system for dispensing fuel responsive to the receipt of bar coded data and magnetic strip data and securing payment therefor, the system comprising:
    a first reader for receiving the bar coded data;
    a second reader for receiving the magnetic strip data;
    a controller for receiving the bar coded data from the first reader and the magnetic strip data from the second reader;
    at least one database responsive to at least the bar coded data for determining terms under which fuel is to be dispensed and returning a control signal to the controller, the control signal containing commands selected such that the fuel is dispensed in accordance with the terms; and
    a dispenser for dispensing the fuel responsive to issuance of the commands by the controller;
    wherein the bar coded data received from the first reader identifies a purchase credit and the database incorporates the purchase credit into the terms under which fuel is to be dispensed.

16. A system according to claim 15 wherein the database contains a customer profile for a customer of the system.

17. A system according to claim 16 wherein the bar coded data is used to access the customer profile and the magnetic strip is for indicating a payment account for the dispensed fuel.

18. A system according to claim 16 wherein the first reader includes an optical wand for reading the bar coded data.

19. A system according to claim 15 wherein the first reader includes a scanning bar code detector.

20. A system according to claim 19 wherein the scanning bar code detector is on a front face of the dispenser.

21. A system according to claim 19 wherein the scanning bar code detector is on a kiosk connected to the dispenser.

22. A system according to claim 19 wherein the scanning bar code detector is capable of reading bar coded receipts.

23. A system according to claim 15 further comprising:
    a customer interface for receiving the commands and communicating information responsive to receipt of the commands.

24. A system according to claim 23 wherein the information responsive to receipt of the commands indicates a customer reward.

25. A system according to claim 24 further comprising:
    a carwash facility and wherein the customer reward is a carwash at a reduced price.

26. A system according to claim 24 further comprising:

means for communicating to the carwash facility the existence of the customer reward.

27. A system according to claim 15 wherein the magnetic strip data received from the second reader identifies payment arrangements and the database incorporates the payment arrangements into the terms under which fuel is to be dispensed.

28. A system for dispensing fuel responsive to the receipt of bar coded data and magnetic strip data and securing payment therefor, the system comprising:

a first reader for receiving the bar coded data;

a second reader for receiving the magnetic strip data;

a controller for receiving the bar coded data from the first reader and the magnetic strip data from the second reader;

at least one database responsive to at least the bar coded data for determining terms under which fuel is to be dispensed and returning a control signal to the controller, the control signal containing commands selected such that the fuel is dispensed in accordance with the terms; and a dispenser for dispensing the fuel responsive to issuance of the commands by the controller;

wherein the bar coded data received from the first reader identifies a discount and the database incorporates the discount into the terms under which fuel is to be dispensed.

29. A system according to claim 28 wherein the magnetic strip data received from the second reader identifies payment arrangement after application of the discount and the database incorporates the payment arrangements after application of the discount into the terms under which fuel is to be dispensed.

* * * * *